C. H. McCORMICK.
MACHINE FOR CUTTING GRASS.
No. 21,573. Patented Sept. 21, 1858.
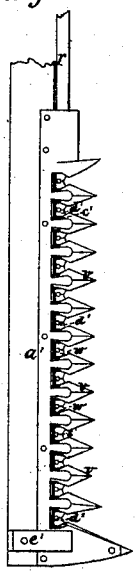
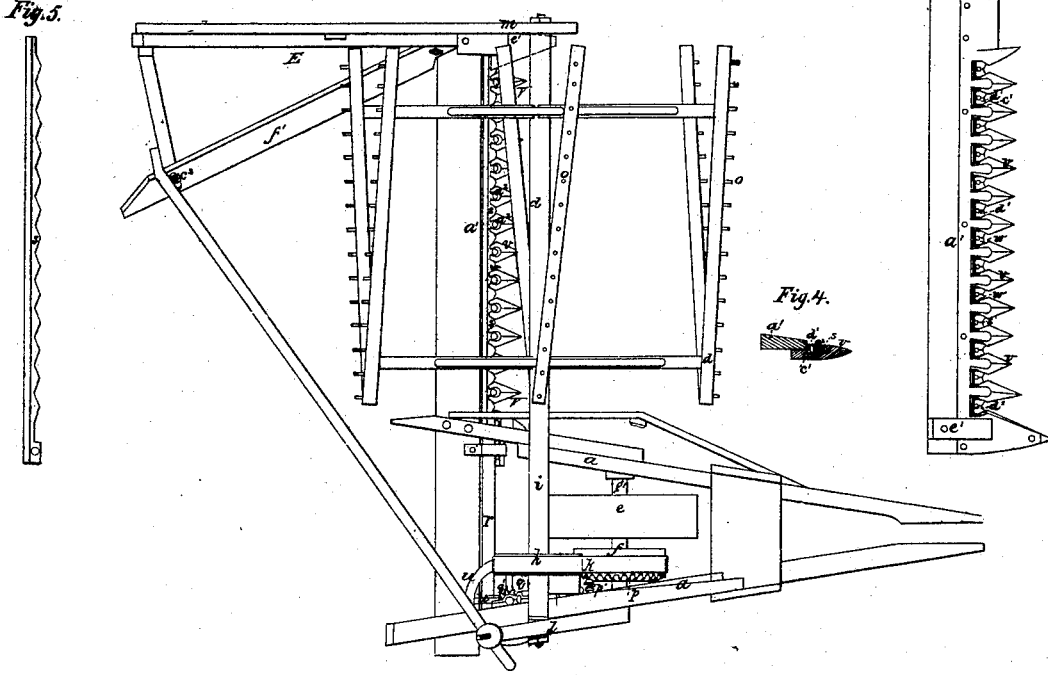
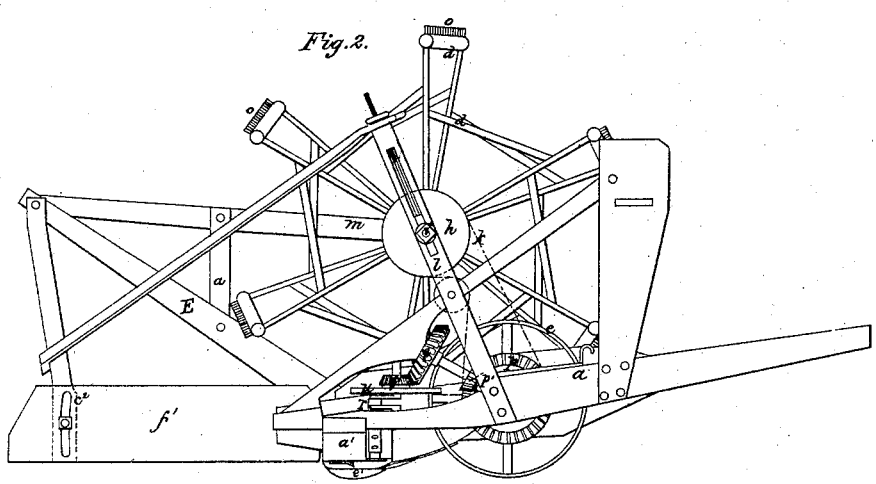

UNITED STATES PATENT OFFICE.

C. H. McCORMICK, OF CHICAGO, ILLINOIS.

IMPROVEMENT IN MACHINES FOR CUTTING GRASS, &c.

Specification forming part of Letters Patent No. 21,573, dated September 21, 1858.

*To all whom it may concern:*

Be it known that I, C. H. McCORMICK, of Chicago, in the State of Illinois, have invented certain new and useful Improvements in Machines for Cutting Grass, &c.; and I do hereby declare that the following is a full, clear, and exact description thereof, reference being had to the accompanying drawings, making part of this specification, in which—

Figure 1 is a plan of the machine; Fig. 2, a side elevation; Fig. 3, a plan of the under side, showing the construction of the sickle and fingers; Fig. 4, a vertical section taken through one of the fingers and sickle, and Fig. 5, a top view of the sickle separate.

The same letters indicate like parts in all the figures.

These improvements are based upon the machines for cutting grain which I patented on the 21st day of June, 1834, the 31st day of January, 1845, and the 23d day of October, 1847, respectively, and the arrangement of the running-gear and the construction of the reel and frame-work are substantially the same as described in the said patents of 1845 and 1847.

My object is to adapt the machines, as aforesaid, which were intended for the cutting of grain, to the cutting of grass; and with this view my invention consists in combining with the widened fingers for separating and sustaining the grass, which from their widest part backward have reversed angles, so as to form an acute angle with the line of motion of the sickle-cutter, as described in my before-mentioned patent of 1845, the sickle made with a scalloped or indented cutting-edge of reversed cuts, the said indentations or scallops being made in sections equal in length, or nearly so, to the distance from the center of one finger to the center of the next adjacent finger, and each section having half its teeth reversed with reference to those of the other half, by means of which combination, while I attain the advantage of cutting against the back angle of the fingers which present an effectual support for the grass, I am enabled to obtain a more acute cutting angle than with a straight sickle, and at the same time avoid all cutting or pulling of the grass at the two extremities of the motion of the sickle while the crank is turning the dead-points, and until the sickle shall attain sufficient motion to cut effectually, without the tendency to draw grass into the fingers and clog the machine; and my invention also consists in cutting out the middle of the upper part of the fingers that project over the front edge of the sickle, in combination with the sickle, for the purpose of discharging anything that may enter between the upper surface of the sickle and the upper part of the fingers.

In the accompanying drawings, $a$ represents the frame-work of the machine, $s$ the sickle, and $d$ the reel, which, with the running-gear, are all constructed substantially like the similar parts in the machines of 1845 and 1847, hereinbefore referred to. The machine rests on the main driving-wheel $e$, by the friction of which the machine is operated. The power is communicated from the main driving-wheel $e$, by a pulley, $f$, on its shaft $g$, to a pulley, $h$, on the shaft $i$ of the reel $d$ by means of the belt $k$. The said reel is hung and turns in adjustable bearings in the upright $l$ and the part $m$ of the frame. Its ribs are armed on their outer peripheries with pins $o$, which serve to gather the grass to the cutting-sickle and scatter it on the ground after it is cut.

By means of the intermediate beveled gearing $p\ p'$ and $q\ q'$ motion is communicated from the main driving-shaft of the wheel $e$ to the connecting-rod $r$, by means of which the sickle $s$ is caused to move back and forth on and within the range of fingers $v$, which are made fast to the finger-beam $a'$, either in sections of two or more connected together and bolted to it, or (as is the case in the reaping-machine) they may be put into it separately by having a shank to go horizontally into a hole through the beam and fast from the back end. Between the said beveled gearing and the said connecting-rod is interposed the balance-wheel $u$ for the purpose of regulating the motion. The fingers $v$, about twelve in number, (more or less,) spread out on each side from the point to the widest part $w$, and thence back the angle is reversed, so that from the widest part back they are gradually narrowed along that part of the edges against which the grass rests when being cut, which part thus forms an acute angle with the line of motion of the sickle, sufficiently acute for giving the proper holding or supporting effect to the fingers without having their edges notched or sickled for the same, as has hitherto been tried under the sickle and found defective, the notches having a tendency to prevent the uniform and unobstructed entrance of the grass or grain into the angle formed by the edges of the sickle and fingers, while no support to the cutting-edge was provided above it, where most required, the roots of the grass or grain (in the ground) affording a support to the under side under the edge of the sickle. The upper surface of these fingers is cut out forward of the finger-piece to form a recess to receive the sickle, and in which it plays, the upper part of each finger being made to extend back over the cutting-edge of the sickle, so that while the grass is being cut it is supported above and below the sickle. The fingers are also formed with a groove, $c'$, in the bottom of the recess, in which grooves play pins $d'$, attached to and projecting from the under surface of the sickle, there being one such pin for each finger. As the sickle vibrates it will be seen that the pins playing in the grooves of the fingers will have the effect to catch and draw out grass or other things that may work in between the sickle and the under part of the fingers, and thus prevent clogging.

Instead of the pins, the bottom and back edge of the sickle may be notched to leave sharp angles to catch the grass, &c., and draw it out; but the pins will be found the most effectual, it is thought. The middle of that part of each finger that projects over the sickle is cut out from the back edge, as at $a^2$, to have a free space for the discharge upward of any thing that may enter between the top of the sickle and the projecting part of the fingers.

The cutting part of the sickle is formed in sections (but may be formed in a single piece) attached to a bar. The sections are equal in length to the distance between the central line of any two adjacent fingers, and each section is widest in the middle, so that the cutting-edge thus constituted presents a series of scallops or indentations, either in slight curves or angular lines. The cutting-edge is cut or formed with sickle-teeth, the inclination of which on opposite sides of the scallops or indentations is reversed, so that in action while the sickle moves in one direction the teeth on one side of the scallop or indentation will cut the grass bearing against the back angle of the tooth toward which it is moving, and with which that edge of the scallop forms an angle more acute than if the cutting-edge were straight, and therefore gives a more acute and better cut.

The throw of the crank is equal or nearly equal to the length of the sections of the sickle, and from this, taken in connection with the breadth of the fingers, it will be seen that there will be no cutting action as the crank approaches and leaves the dead-points, for the most projecting part of each section passes the back angle of the finger against which it cuts before the crank reaches the end of its throw; and hence from thence to the end of the throw the other side of the scallop, which forms an obtuse angle with this tooth, moves under the tooth, and therefore recedes from the point of the tooth and permits the machine to move forward without crowding the grass. During this the bottom of the scallop next the adjoining section has passed out from under the adjoining tooth, and after the crank has passed its dead-point it moves the sickle in the reverse direction until the bottom of the scallop reaches the back angle of the tooth before it begins to make the reverse cut; and hence before the crank has reached that part of its rotation in which it gives a rapid motion to the sickle no cutting takes place, but, on the contrary, that part of the cutting edge which passes the reversed angle of the tooth is actually receding. In this way it will be seen that the cutting takes place only during that part of the throw of the crank which gives the most rapid motion to the sickle, and that during the other part of the throw not only does the sickle edge recede at the point of the contact with the side of the finger against which the cutting is to take place, but it is the reverse sickle-teeth which pass the finger at that time. In this way all tendency to clog the machine is avoided and the cutting action is rendered efficient. On the left-hand side of the machine there is a plate of iron, $e'$, the bottom of which is in the form of a shoe, to run on the ground. A small wheel, if desired, may be substituted for this; but the shoe will be found preferable. This plate extends up and forward of the range of teeth, and constitutes a divider to separate the grass to be cut from that which is to be left standing, and to incline inward that which is to be cut. The end of the reel should extend over this divider to catch and carry the grass to the sickle, and when cut insure the delivery of it onto the ground.

A bar, E, extends upward and rearward from the top of the divider $e'$ to the top of the post which supports the rear end of the bar or lever $m$, that carries the outer end of the reel. This bar is for the purpose of separating the tops of the grass which is cut from the tops of that which is left standing. As the tops of those varieties of grass which are branching are frequently intertwined, so that it requires the exertion of considerable force to separate them, this entanglement prevents the cut grass from sliding off the scraper readily, and thus tends to clog the outer end of the machine. Hence the inclined bar E, in separating the tops, performs a very important function.

To the left-hand end of the finger-piece is jointed a raking-board, $f'$. It is secured by a screw-bolt, on which it turns freely. From this point of attachment backward the board inclines toward the right, and at its rear end is secured to the frame by a screw-bolt, $c^2$, which passes through an elongated hole or mortise in the board, that it may be free to move up and down and adapt itself to the surface of the ground, so that its lower edge shall rake the cut grass so far from the standing grass as to clear the way for the passage o the wheel of the machine at the next trip. This board is inclined at an angle of sixty-five degrees (more or less) with the ground, so that its lower edge shall move in advance of its upper edge, in order that it may tend to run under the grass instead of overrunning it, as it would do if placed in a vertical position.

Disclaiming such combination of guard-fingers and sickle as is shown in Jonathan Read's machine patented March 12, 1842, what I claim as my invention, and desire to secure by Letters Patent, is—

1. The combination of the sickle having the scalloped or indented edge and serrated reversed teeth, with a continuous series of fingers, having the back reversed angles for supporting the grain or grass to be cut to the edge of the sickle, both above and below the edge, or above the edge only, substantially as described.

2. Cutting out the middle of the upper part of the fingers that project over the sickle, as described, in combination with the vibrating sickle, as described, for the purpose specified.

C. H. McCORMICK.

Witnesses:
WM. H. BISHOP,
CHARLES N. BAMBURGH.